United States Patent
Urbach

[11] Patent Number: 6,070,515
[45] Date of Patent: Jun. 6, 2000

[54] STEERING SYSTEM

[75] Inventor: Brian A. Urbach, Rochester Hills, Mich.

[73] Assignee: TRW Inc., Lyndhurst, Ohio

[21] Appl. No.: 09/197,865

[22] Filed: Nov. 23, 1998

[51] Int. Cl.$^7$ ................................................... F15B 9/10
[52] U.S. Cl. .......................................... 91/375 A; 91/375 R
[58] Field of Search .............................. 91/375 R, 375 A

[56] References Cited

U.S. PATENT DOCUMENTS

| | | |
|---|---|---|
| 3,817,151 | 6/1974 | Kawabata et al. . |
| 3,930,554 | 1/1976 | Ward . |
| 4,034,825 | 7/1977 | Adams . |
| 4,339,986 | 7/1982 | Atkin . |
| 4,373,598 | 2/1983 | Elser . |
| 4,481,866 | 11/1984 | Matouka . |
| 4,819,545 | 4/1989 | Dymond ........................... 91/375 A X |
| 5,046,574 | 9/1991 | Goodrich, Jr. et al. .......... 91/375 A X |
| 5,230,273 | 7/1993 | Fraley, Jr. . |
| 5,390,755 | 2/1995 | Joerg et al. . |
| 5,465,805 | 11/1995 | Sangret . |
| 5,478,059 | 12/1995 | Toyoshi et al. . |
| 5,517,096 | 5/1996 | Shtarkman et al. . |
| 5,571,238 | 11/1996 | Breitweg et al. ..................... 91/375 A |
| 5,649,467 | 7/1997 | Sangret ................................. 91/375 A |
| 5,680,804 | 10/1997 | Eberhart . |
| 5,707,049 | 1/1998 | Dodak .............................. 91/375 A X |

*Primary Examiner*—Hoang Nguyen
*Attorney, Agent, or Firm*—Tarolli, Sundheim, Covell, Tummino & Szabo L.L.P.

[57] ABSTRACT

A steering system (10) for a vehicle includes inner and outer valve members (40 and 42) which are rotatable relative to each other to port fluid to a vehicle power steering motor (31). A torsion bar spring (102) is connected with the inner and outer valve members (40 and 42) to resist relative rotation between the valve members during operation of the steering system (10). A torsion tube spring (202) has a first end portion (206) connected with an outer valve member (42) and a second end portion (210). The second end portion (210) of the torsion tube spring (202) is connected with a clutch (212). The clutch (212) is operable from a disengaged condition to an engaged condition to connect the second end portion (210) of the torsion tube spring (202) with the inner valve member (40). Connecting the second end portion (210) of the torsion tube spring (202) with the inner valve member (40) increases resistance to relative rotation between the inner and outer valve members (40 and 42).

7 Claims, 4 Drawing Sheets

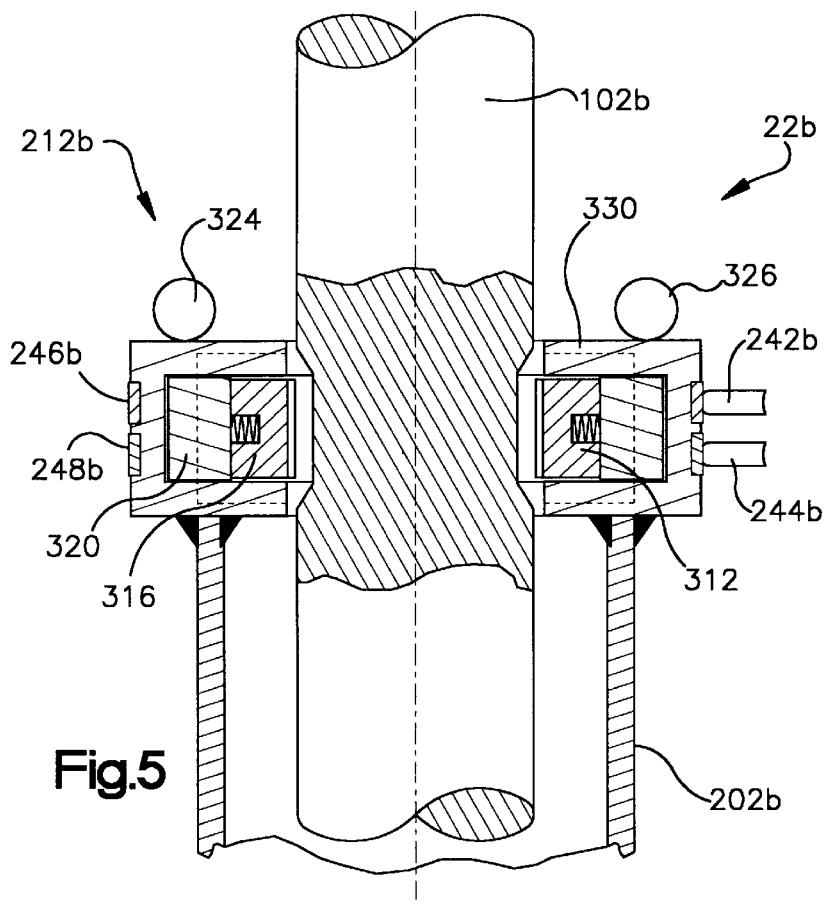
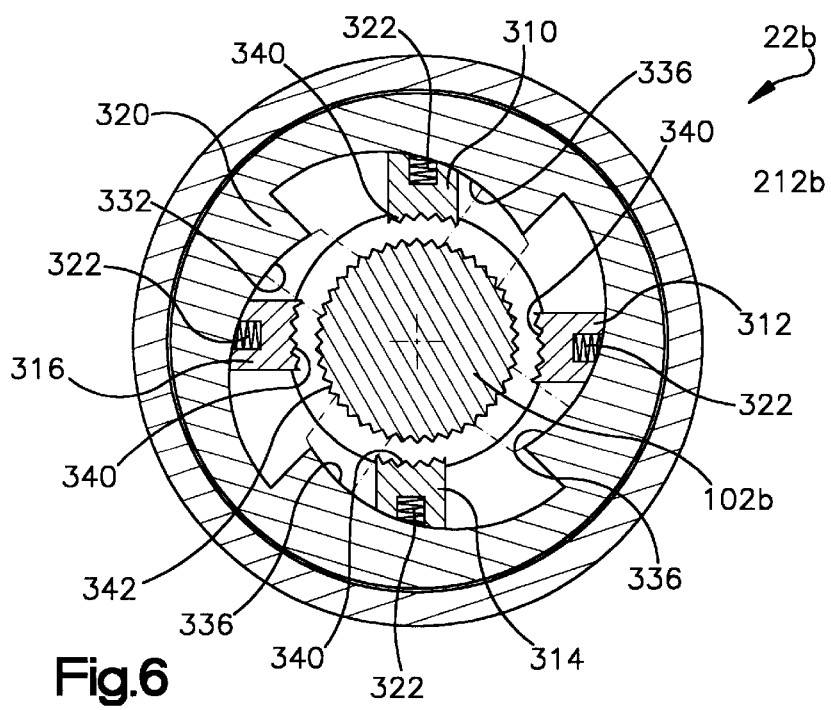

STEERING SYSTEM

BACKGROUND OF THE INVENTION

The present invention relates to a power steering system for turning steerable vehicle wheels and, more specifically, to a power steering control valve used in the power steering system.

A known power steering system includes inner and outer valve members which are rotatable relative to each other to port fluid to a vehicle steering motor. A torsion bar spring is connected with the inner and outer valve members to resist relative rotation between the inner and outer valve members and to urge the inner and outer valve members to their initial positions when rotational force is no longer applied to a steering wheel and the inner valve member. A power steering control valve having this construction is disclosed in U.S. Pat. No. 5,230,273. Another known power steering control valve is disclosed in U.S. Pat. No. 4,339,986.

It has previously been suggested that the resistance provided by a torsion bar spring to relative rotation between inner and outer valve members could be varied by varying the effective length of the torsion bar spring. Thus, in U.S. Pat. No. 4,481,866, an anchor nut extends between a torsion bar spring and an inner valve member. By moving the anchor nut along the torsion bar spring, the effective length of the torsion bar spring is varied. In U.S. Pat. No. 3,930,554, a plunger is moved into engagement with a recess in a central portion of a torsion bar spring to decrease the effective length of the torsion bar spring. Decreasing the effective length of the torsion bar springs increases the resistance of the torsion bar spring to relative rotation between the inner and outer valve members.

SUMMARY OF THE INVENTION

The present invention relates to a new and improved steering system for a vehicle. The steering system includes first and second valve members which are rotatable relative to each other to port fluid to a vehicle power steering motor. A first spring, which may be a torsion bar spring, is connected with the valve members to resist relative rotation between the valve members. A second spring, which may be a torsion tube spring, is connected with one of the valve members and a clutch. The clutch is operable from a disengaged condition to an engaged condition to increase resistance to relative rotation between the valve members.

BRIEF DESCRIPTION OF THE DRAWINGS

The foregoing and other features of the invention will become more apparent upon a consideration of the following description taken in connection with the accompanying drawings wherein:

FIG. 5 is a fragmentary schematic sectional view of an embodiment of the clutch using jaws to interconnect the torsion bar spring and the torsion tube spring; and FIG. 6 is a fragmentary sectional view, taken generally along the line 6—6 of FIG. 5, further illustrating the construction of the jaw-type clutch.

DESCRIPTION OF SPECIFIC PREFERRED EMBODIMENTS OF THE INVENTION

General Description

Figure 1:
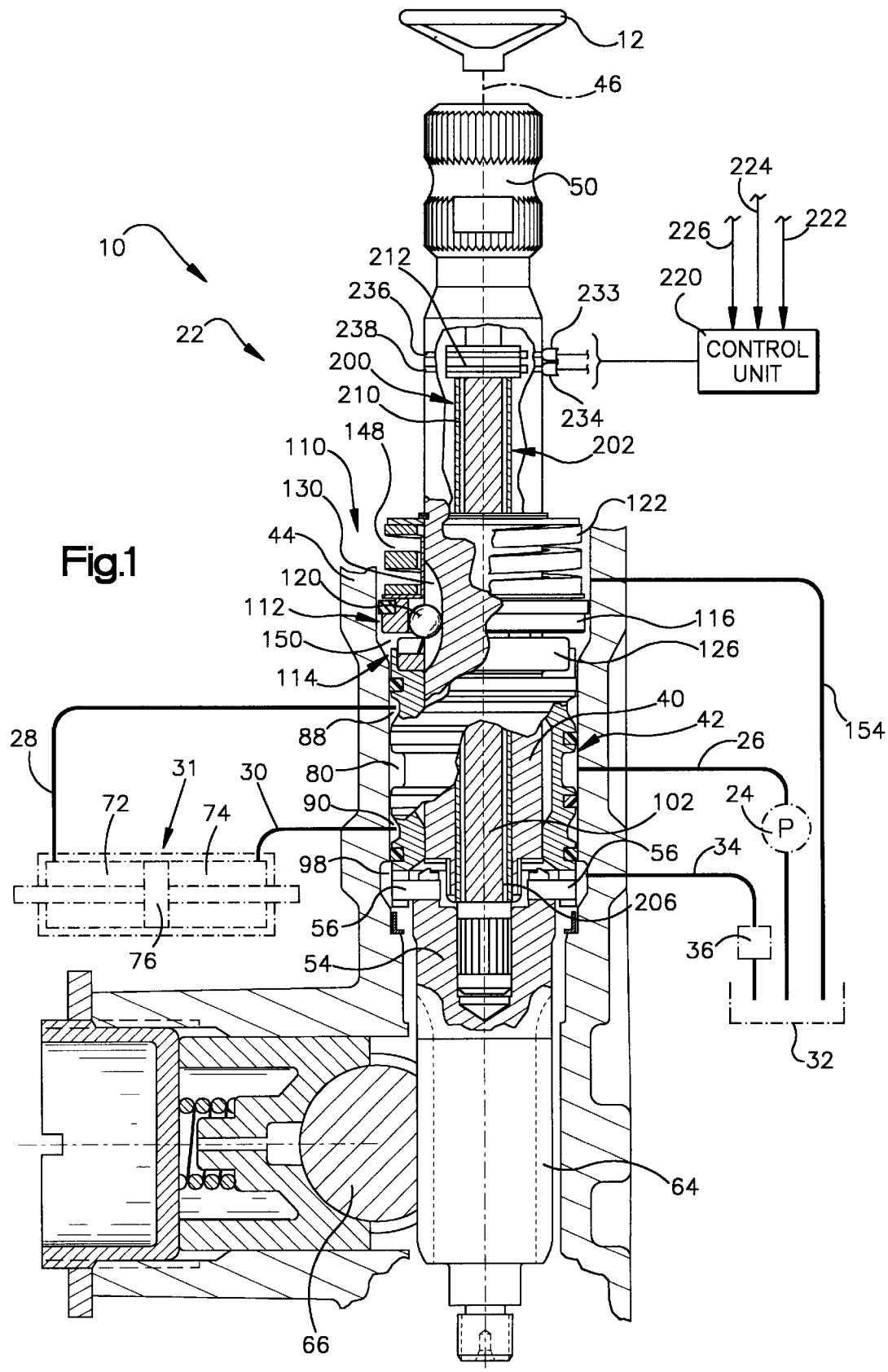
FIG. 1 is a fragmentary sectional schematic illustration of a power steering control valve constructed in accordance with the present invention.

A vehicle power steering system 10 (FIG. 1) is operable to turn steerable vehicle wheels (not shown) upon rotation of a steering wheel 12 by an operator of a vehicle. Rotation of the steering wheel 12 actuates a power steering control valve 22 to port fluid from an engine driven pump 24 and supply conduit 26 to either one of a pair of actuator conduits 28 and 30. The high pressure fluid conducted from the supply conduit 26 through one of the actuator conduits 28 or 30 effects operation of the actuator 31 to turn the steerable vehicle wheels in a known manner. Fluid is conducted from the actuator 31 to a reservoir 32 through the other one of the actuator conduits 28 or 30, the power steering control valve 22, return conduit 34, and a speed responsive control unit 36.

The power steering control valve 22 includes an inner valve member 40 and an outer valve member 42. The outer valve member 42 is cylindrical and encloses the inner valve member 40. The inner valve member 40 and outer valve member 42 are rotatable relative to each other and to a housing 44 about a common central axis 46.

The inner valve member 40 is formed as one piece with a cylindrical input member or valve stem 50 (FIG. 1) which is connected with the steering wheel 12. The one-piece outer valve member 42 is connected with a follow-up member 54 by pins 56. The follow-up member 54 is rotatably supported in the housing 44 by suitable bearings (not shown). A pinion gear 64 is formed on the follow-up member 54. The pinion gear 64 is disposed in meshing engagement with a rack 66. The rack 66 is connected with the power steering actuator 31 and steerable vehicle wheels.

The power steering control valve 22 is of the known open-center type. Therefore, when the power steering control valve is in an unactuated position, fluid pressure from the pump 24 is conducted through the actuator conduits 28 and 30 to actuator cylinder chambers 72 and 74 on opposite sides of a piston 76 in the power steering actuator 31. Fluid flow is conducted from the power steering control valve 22 to the reservoir 32 through the return conduit 34.

The power steering control valve 22 is pressure balanced. Therefore, equal fluid pressures are present in the actuator cylinder chambers 72 and 74 when the power steering control valve 22 is in the unactuated condition.

Upon rotation of the steering wheel 12 (FIG. 1) and rotation of the valve stem 50, the inner valve member 40 is rotated about the axis 46 relative to the housing 44 and outer valve member 42. This directs high pressure fluid from the pump 24 to one of the actuator conduits 28 or 30 and directs fluid from the other actuator conduit to the reservoir 32. Since the power steering control valve 22 is pressure balanced, equal amounts of rotation of the steering wheel in opposite directions from the initial position results in the same relatively high fluid pressure being conducted through the actuator conduits 28 and 30 to actuator cylinder chambers 72 and 74, respectively.

Rotation of the inner valve member 40 in one direction relative to the outer valve member 42 will reduce the extent of communication of the actuator conduit 28 with the reservoir 32 and increase the extent of communication of the actuator conduit 28 with the pump 24. This results in high-pressure fluid from the pump 24 being conducted to the actuator cylinder chamber 72. This high fluid pressure moves the piston 76 toward the right (as viewed in FIG. 1).

As the piston 76 moves toward the right, fluid discharged from the chamber 74 is conducted to the reservoir 32 through the actuator conduit 30 and return conduit 34.

Similarly, rotation of the inner valve member 40 through the same distance in the opposite direction relative to the outer valve member 42 will reduce the extent of communication of the actuator conduit 30 with the reservoir 32 and increase the extent of communication of the actuator conduit 30 with the pump 24. This results in the same relatively high fluid pressure being conducted from the pump 24 to the actuator cylinder chamber 74 as was previously conducted to the actuator cylinder chamber 72 upon rotation of the steering wheel in the other direction. The relatively high fluid pressure in the actuator cylinder chamber 74 moves the piston 76 toward the left (as viewed in FIG. 1). As the piston 76 moves toward the left, fluid discharged from the chamber 72 is conducted to the reservoir 32 through the actuator conduit 28 and return conduit 34.

As the power steering actuator 31 operates, the rack 66 rotates the pinion gear 64 and follow-up member 54. This rotates the outer valve member 42 relative to the inner valve member 40. As the power steering actuator 31 is operated to turn the steerable vehicle wheels to an extent corresponding to the extent of rotation of the inner valve member 40, the rack 66 rotates the pinion 64 through a distance sufficient to move the outer valve member 42 to its central position relative to the inner valve member. When this occurs, the fluid pressure in the actuator cylinder chambers 72 and 74 equalizes and the actuator 31 stops operating.

When the power steering control valve 22 is in the initial position, fluid pressure from the pump 24 is conducted to an annular central groove 80 (FIG. 1) formed in the outer valve member 42. Fluid flows from the groove 80 to the inside of the cylindrical outer valve member 42 through three passages (not shown) spaced equal distances apart about the circumference of the groove 80. The inner valve member 40 has axially extending grooves (not shown) which cooperate with axially extending grooves and lands formed inside the outer valve member 42 in a known manner. One set of grooves on the inside of the outer valve member 42 is connected in fluid communication with an annular outer groove 88 connected with the actuator conduit 28. A second set of axially extending grooves on the inside of the outer valve member 42 is connected in fluid communication with an annular outer groove 90 formed in the outer valve member and connected with the actuator conduit 30.

Openings (not shown) extend radially inward on alternate grooves formed in the inner valve member 40 to an axially extending central passage in the inner valve member. The central passage is connected in fluid communication with a chamber 98 at the lower end of the outer valve member 42. The chamber 98 is connected in fluid communication with the reservoir 32 (FIG. 1) through the return conduit 34 and speed responsive control unit 36.

A cylindrical torsion bar spring 102 is disposed in the axially extending fluid return passage formed on the central axis 46 of the inner valve member. The upper end of the torsion bar spring 102 is connected to the valve stem 50. The lower end of the torsion bar spring 102 is connected to the follow-up member 54 and outer valve member 42.

The torsion bar spring 102 twists to enable relative rotation to occur between the inner and outer valve members 40 and 42. When rotational force is no longer applied to the steering wheel and inner valve member 40, the torsion bar spring 102 urges the inner and outer valve members 40 and 42 to their initial positions.

A power steering resistance control system 110 (FIG. 1) controls the force which is required to actuate the power steering control valve 22 in accordance with vehicle speed. Thus, at relatively low vehicle speeds, a small force is required to rotate the inner valve member 40 relative to the outer valve member 42. At relatively high vehicle speeds, a larger force is required to rotate the inner valve member 40 relative to the outer valve member 42.

The power steering resistance control system 110 includes two major components, namely, a pressure responsive control unit 112 disposed in the power steering control valve housing 44 and the speed responsive control unit 36. The pressure responsive control unit 112 resists relative rotation between the inner and outer valve members 40 and 42. The speed responsive control unit 36 causes the pressure responsive control unit 112 to resist relative rotation between the inner and outer valve members 40 and 42 with a force which varies as a function of vehicle speed.

The pressure responsive control unit 112 includes a force transmitting assembly 114 which resists relative rotation between the inner and outer valve members 40 and 42. The force transmitting assembly 114 includes an upper reaction element or disk 116. The annular upper reaction element or disk 116 is pressed downwardly against a plurality of force transmitting elements or balls 120 by a spring 122. The spherical force transmitting elements or balls 120 are forced by the upper reaction element 116 into a plurality of recesses (not shown) formed in a lower reaction element or disk. In addition to engaging the generally radially extending recesses in the annular lower reaction element 126, the balls 120 engage axially extending recesses 130 formed in the cylindrical inner valve member 40.

The lower reaction element 126 is fixedly connected with the upper end portion of the outer valve member 42. The spherical force transmitting elements or balls 120 engage recesses in the lower reaction element 126 and recesses 130 in the inner valve member 40. Therefore, the balls 120 transmit force between the inner and outer valve members 40 and 42 to resist relative rotation between the inner and outer valve members.

Upon the occurrence of relative rotation between the inner and outer valve members 40 and 42, the force transmitting elements or balls 120 are cammed part way out of the recesses in the lower reaction element 126. As this occurs, the balls 120 are moved axially upward (as viewed in FIG. 1) in the elongated recesses 130 formed in the inner valve member 40. As the balls 120 move upward in the recesses 130 in the inner valve member 40, the balls move the upper reaction element 116 upwardly against the influence of the spring 122.

As the balls 120 move upward and part way out of the recesses formed in the lower reaction element 126, the balls 120 remain in engagement with the axially extending recesses 130 formed in the inner valve member 40. Although the balls 120 move upward in the recesses 130, lower portions of the balls remain in the recesses in the lower force-transmitting element 126. Therefore, the balls 120 are effective to transmit force directly from the force-transmitting element 126 to the inner valve member 40.

The annular upper reaction element 116 carries an annular outer seal which engages a cylindrical inner side surface of the housing 44. In addition, an inner seal engages the outer seal and the inner valve member 40. The inner and outer seals cooperate with the inner valve member 40 and cylindrical inner side surface 140 of the housing 44 to form a pair of annular chambers 148 and 150 on axially opposite sides of the upper reaction element 116.

The fluid pressure in the lower chamber 150 urges the upper reaction element 116 upward away from the lower reaction element 126, in opposition to the spring 122. The force applied by the spring 122 against the upper reaction element 116, in normal operation, is always greater than the fluid pressure force applied against the lower side of the upper reaction element 116 by the fluid in the pressure chamber 150. Therefore, the upper reaction element 116, during normal operation, always remains in abutting engagement with the balls or force transmitting elements 120.

It is contemplated that some fluid will leak past the outer seal 138 and inner seal 144 into the spring chamber 148 (FIG. 1). Therefore, the spring chamber 148 is connected with the reservoir 32 through a drain conduit 154. The upper end of the valve member 40 is aligned with the housing 44 by an annular bearing or bushing which engages the inner side surface of the housing and the outer side surface of the valve stem 50.

The inner and outer valve members 40 and 42 may have the same general construction and cooperate with each other in the same manner as is described in U.S. Pat. No. 4,276, 812 issued Jul. 7, 1981 and entitled "Power Steering Valve and Method of Making the Same". However, it should be understood that the inner and outer valve members 40 and 42 could have a different construction if desired. The overall construction of the power steering control valve 22 is generally similar to the construction of the power steering valve disclosed in U.S. Pat. No. 5,230,273 issued Jul. 27, 1993 and entitled "Apparatus for Controlling Fluid Flow to a Power Steering Actuator". However, the power steering control valve 22 could have a construction which is different than the specific construction disclosed herein if desired.

Spring System

Figure 2:
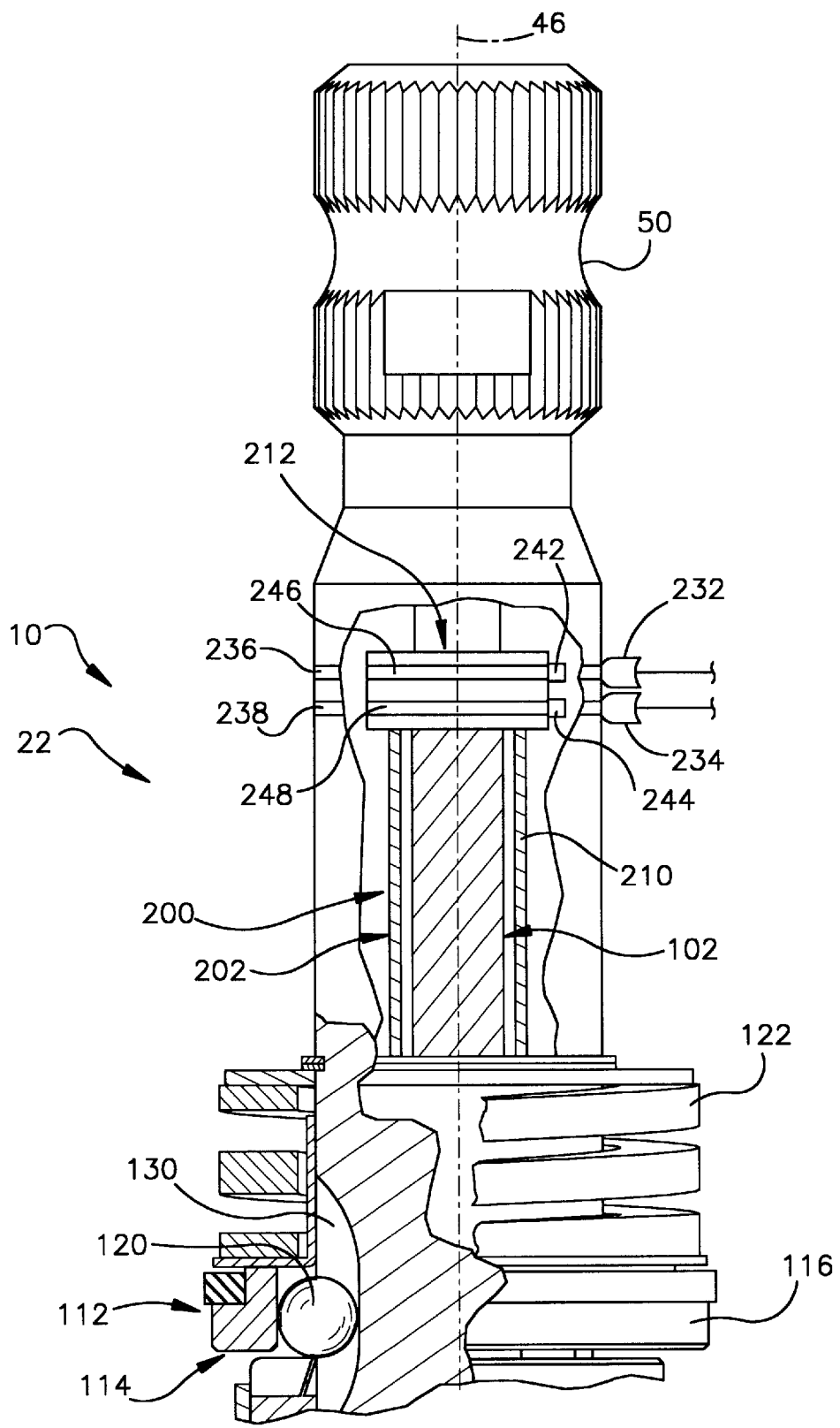
FIG. 2 is an enlarged fragmentary illustration of a portion of FIG. 1.

In accordance with a feature of the present invention, the torsion bar spring 102 (FIGS. 1 and 2) forms one spring in a spring system 200. The spring system 200 also includes a cylindrical torsion tube spring 202 which partially encloses and is coaxial with the torsion bar spring 102. The torsion tube spring 200 has a lower (as viewed in FIG. 1) end portion 206 which is fixedly connected with the follow-up member 54 and a lower end of the torsion bar spring 102. The lower end portion 206 of the torsion tube spring 202 is connected with the outer valve member 42 through the pins 56. Therefore, the lower end portion 206 of the torsion tube spring 202 and the lower end portion of the torsion bar spring 102 are both connected with the outer valve member 42 by the pins 56.

The torsion tube spring 202 has an upper end portion 210 (FIGS. 1 and 2) which is connected with a clutch 212. The clutch 212 is operable between a disengaged condition and an engaged condition. When the clutch 212 is in the engaged condition, the clutch is effective to transmit force from the upper end portion 210 of the torsion tube spring 202 to the input member or valve stem 50 through the upper end portion of the torsion bar spring 102. As was previously mentioned, the input member or valve stem 50 is integrally formed as one piece with the inner valve member 40. Therefore, the clutch 212 connects the upper end portion 210 of the torsion tube spring 202 with the inner valve member 40 through the upper end portion of the torsion bar 102 and the valve stem 50 when the clutch 212 is in the engaged condition.

When the clutch 212 is in the disengaged condition, the clutch is ineffective to transmit force between the upper end portion 210 of the torsion tube spring and the upper portion of the torsion bar 102. When the clutch 212 is in the disengaged condition, the upper end portion 210 of the torsion tube spring 202 is disconnected from the torsion bar 102, the input member or valve stem 50 and the inner valve member 40. At this time, only the lower end portion 206 of the torsion tube spring 202 is connected with the torsion bar spring 102. Therefore, when the clutch 212 is in the disengaged condition, the torsion tube spring 202 is ineffective to resist relative rotation between the inner and outer valve members 40 and 42.

When the clutch 212 is in the engaged condition, the torsion tube spring 202 is connected in parallel with the torsion bar spring 102. The engaged clutch 212 connects the upper end portion 210 of the torsion tube spring 202 to the torsion bar spring 102. This results in the upper end portion 210 of the torsion tube spring 202 being connected with the input member or valve stem 50 and inner valve member 40 through the engaged clutch 212 and torsion bar spring 102. Relative rotation between the inner and outer valve members 40 and 42 is resisted under the combined influence of both the torsion bar spring 102 and the torsion tube spring 202 when the clutch 212 is engaged.

The engaged clutch 212 is effective to transmit force between the inner and outer valve members 40 and 42 during turning of steerable vehicle wheels to either the left or the right. Thus, the engaged clutch 212 transmits force between the inner and outer valve members 40 and 42 upon the occurrence of either clockwise or counterclockwise rotation of the steering wheel 12. When the clutch 212 is disengaged, relative rotation between the inner and outer valve members 40 and 42 is resisted by only the torsion bar spring 102. When the clutch 212 is engaged, relative rotation between the inner and outer valve members 40 and 42, in either direction, is resisted by the torsion bar spring 102 and torsion tube spring 202.

A control unit 220 (FIG. 1) is connected with the clutch 212. The control unit 220 effects operation of the clutch 212 between the engaged and disengaged conditions as a function of vehicle operating conditions. The control unit 220 has an input 222 which varies as a function of vehicle speed. Another input 224 to the control unit 220 varies as a function of lateral acceleration of the vehicle. A third input 226 to the control unit 220 varies as a function of the yaw rate of the vehicle.

An algorithm is provided in the control unit 220 to determine the desired amount of resistance to relative rotation between the inner and outer valve members 40 and 42. When the control unit 220 determines that the torsion bar spring 102 can provide the desired amount of resistance to relative rotation between the inner and outer valve members 40 and 42, the control unit 220 maintains the clutch 212 in the disengaged condition. However, when the control unit 220 determines that the torsion bar spring 102 can not provide the desired resistance to relative rotation between the inner and outer valve members 40 and 42, the control unit 220 effects operation of the clutch 212 from the disengaged condition to the engaged condition.

During operation of the vehicle at relatively low speeds, it is desired to have a relatively small resistance to relative rotation between the inner and outer valve members 40 and 42. Therefore, during low speed operation of the vehicle, the control unit 220 maintains the clutch 212 in a disengaged condition. At low vehicle speeds with the clutch 212 disengaged, relative rotation between the inner and outer valve members 40 and 42 is resisted by only the torsion bar spring 102.

When the vehicle is traveling at a higher rate of speed, it is desired to have a relatively large resistance to relative rotation between the inner and outer valve members 40 and 42. Therefore, when the vehicle is traveling at a higher speed, the control unit 220 engages the clutch 212. At higher vehicle speeds with the clutch 212 engaged, relative rotation between the inner and outer valve members 40 and 42 is resisted by the combined influence of the torsion bar spring 102 and the torsion tube spring 202.

It is contemplated that the clutch 212 may have many different known constructions. It is also contemplated that the clutch 212 may be operated between the engaged and disengaged conditions in many different ways. However, it is believed that it may be desired to utilize a clutch 212 having an electrical actuator.

To provide for the conduction of electrical energy to the clutch 212, outer contacts 232 and 234 (FIG. 1) are mounted on the housing 44 and are connected with the control unit 220. The outer contacts 232 and 234 are stationary relative to the housing 44. The outer contacts 232 and 234 are electrically insulated from the housing 44.

The outer contacts 232 and 234 (FIGS. 1 and 2) engage a pair of conductive strips 236 and 238 which are fixedly connected with the input member or valve stem 50. The conductive strips 236 and 238 are electrically insulated from each other and from the input member or valve stem 50. The conductive strip 236 is engaged by the outer contact 232. The conductive strip 238 is engaged by the outer contact 234.

A pair of inner contacts 242 and 244 (FIG. 2) are mounted on the inside of the input member or valve stem 50 and are electrically connected with the conductive strips 236 and 238. The inner contacts 242 and 244 are electrically insulated from each other and from the input member or valve stem 50. The inner contacts 242 and 244 move with the input member or valve stem 50 relative to the housing 44 and clutch 212.

The inner contacts 242 and 244 engage a pair of conductive strips 246 and 248 on the outside of the clutch 212. The conductive strips 246 and 248 on the clutch 212 are electrically insulated from each other and from the housing for the clutch. During actuation of the power steering control valve 22 with the clutch 212 disengaged, the inner contacts 242 and 244 move relative to the conductive strips 246 and 248 on the clutch.

The annular conductive strips 236, 238, 246 and 248 are disposed in a coaxial relationship with each other and with the central axis 46 of the inner and outer valve members 40 and 42. During rotation of the inner valve member 40 and input member or valve stem 50 relative to the housing 44, the stationary outer contacts 232 and 234 are effective to electrically connect the conductive strips 236 and 238 on the input member or valve stem with the control unit 220. During relative rotation between the clutch 212 and the input member or valve stem 50, the inner contacts 242 and 244 maintain an electrical connection between the outer conductive strips 236 and 238 and the conductive strips 246 and 248 on the clutch 212.

Friction Clutch

It is contemplated that the clutch 212 could have many different constructions. In the embodiment of the invention illustrated schematically in FIG. 3, the clutch 212 is a friction clutch. The clutch 212 includes an annular housing 260 which extends around the torsion bar spring 102. The annular housing 260 is disposed in a coaxial relationship with the torsion bar spring 102 and with the cylindrical torsion bar tube 202. The housing 260 is fixedly connected with the upper (as viewed in FIG. 3) end portion 210 of the torsion bar tube 202.

An annular friction disc 262 is disposed in a coaxial relationship with the housing 260. The annular friction disc 262 is movable upward (as viewed in FIG. 3) by a plurality of solenoids 264 disposed within the housing 260. The solenoids 264 are energized by electrical energy conducted from the conductive strips 246 and 248 (FIG. 2) on the clutch 212 when the clutch is to be engaged.

Energization of the solenoids 264 moves the friction disc 262 axially upward into engagement with an annular flange 270. The flange 270 is fixedly connected with the torsion bar spring 102. Upon engagement of the friction disc 202 with the flange 270, relative rotation between the torsion bar spring 102 and torsion bar tube spring 202 is resisted by frictional force transmitted between the friction disc 262 and flange 270. This results in the torsion bar spring 102 and the torsion bar tube spring 202 being connected in parallel through the clutch 212. Therefore, both the torsion bar spring 102 and the torsion bar tube spring 202 are effective to resist relative rotation between the inner and outer valve members 40 and 42 (FIG. 1).

The force with which the friction disc 262 is pressed against the annular flange 270 varies as a direct function of the magnitude of an electrical current conducted from the control unit 220 (FIG. 1) to the solenoids 264. The solenoids 264 are electrically connected with the control unit 220 through the outer contacts 232 and 234 (FIG. 2), conductive strips 236 and 238, inner contacts 242 and 244, and conductive strips 246 and 248. Therefore, an electrical interconnection is maintained between the control unit 220 and solenoids 264 during rotation of the torsion bar spring 102 and input member or valve stem 50 relative to each other and relative to the housing 44 and/or torsion tube spring 202.

When the solenoids 264 are energized by electrical current from the control unit 220 (FIG. 1), the friction disc 262 (FIG. 3) may be pressed against the flange 270 by the solenoids 264 with sufficient force to prevent relative movement between the upper end portion 210 of the torsion tube spring 202 and the flange. Alternatively, the friction disc 262 may be pressed against the flange 270 by the solenoids 264 with a force which is insufficient to prevent relative movement between the upper end portion 210 of the torsion tube spring 202 and the flange. Even if there is sliding movement between the friction disc 262 and flange 270, the clutch 212 will transmit sufficient force to enable the torsion tube spring 202 to assist the torsion bar spring 102 in resisting relative rotation between the inner and outer valve members 40 and 42 when the solenoids 264 are energized.

Figure 3:
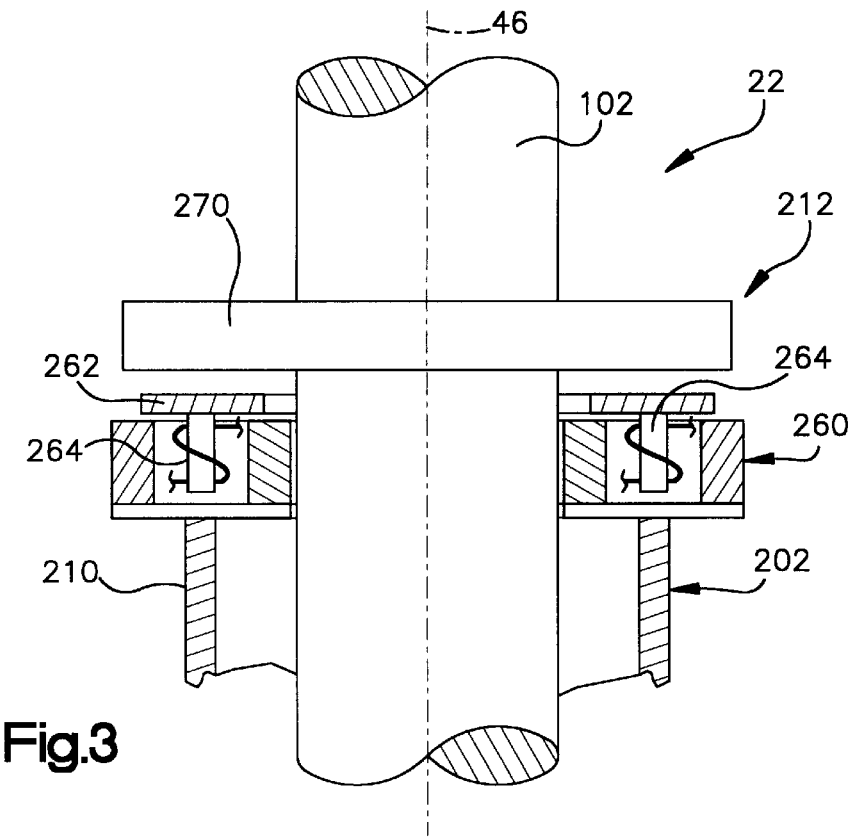
FIG. 3 is an enlarged fragmentary schematic sectional view of a clutch used in the control valve of FIG. 1 to interconnect a torsion bar spring and a torsion tube spring.

Although only a single friction disc 262 has been illustrated in FIG. 3, it is contemplated that a second friction disc could be provided adjacent to the opposite (upper) side of the flange 270. If this was done, the housing 260 would be extended upward (as viewed in FIG. 3) to enclose the second friction disc 262 and solenoids, corresponding to the solenoids 264, which are energizeable to move the second friction disc into engagement with the flange 270.

Fluid Clutch

Figure 4:
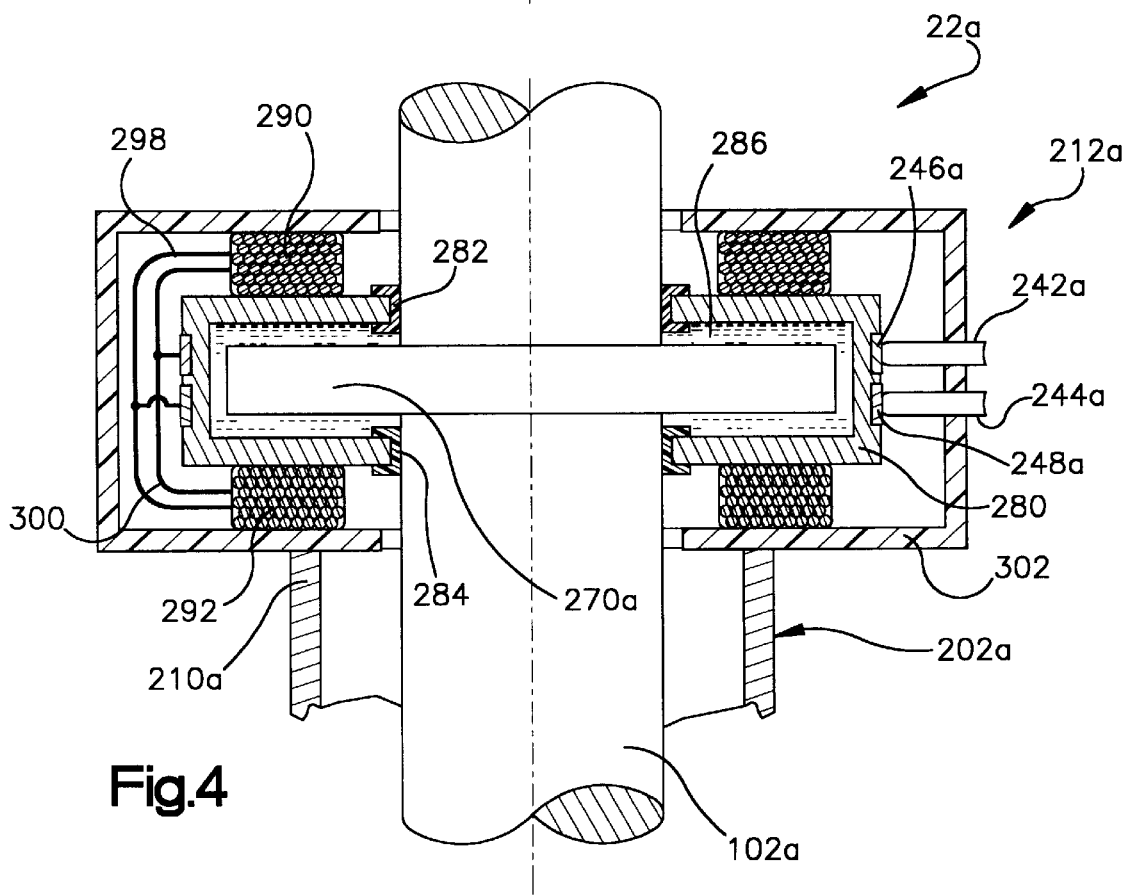
FIG. 4 is a fragmentary schematic sectional view, generally similar to FIG. 3, of an embodiment of the clutch using a magnetic fluid to interconnect the torsion bar spring and the torsion tube spring.

In the embodiment of the invention illustrated in FIG. 3, a friction clutch is provided to interconnect the torsion tube spring 202 and the torsion bar spring 102. In the embodiment of the invention illustrated in FIG. 4, a fluid clutch containing a magnetic fluid is utilized to interconnect the torsion bar spring and the torsion tube spring. Since the embodiment of the invention illustrated in FIG. 4 is generally similar to the embodiment of the invention illustrated in FIGS. 1–3, similar numerals will be utilized to designate similar components, the suffix letter "a" being associated with the numerals of FIG. 4 to avoid confusion.

A power steering control valve 22a has the same general construction as the power steering control valve 22 illustrated in FIG. 1. However, in the embodiment of the invention illustrated in FIG. 4, the clutch 212a is a fluid clutch containing a magnetic fluid. The clutch 212a is operable between a disengaged condition and an engaged condition. When the clutch 212a is in the disengaged condition, the upper end portion 210a of the torsion tube spring 202a is disconnected from the torsion bar spring 102a. When the clutch 212a is in the engaged condition, the upper end portion 210a of the torsion tube spring 202a is connected with the torsion bar spring 102a.

The torsion bar spring 102a includes an annular flange 270a formed of a magnetic material. A housing 280 encloses the flange 270a. The housing 280 is formed of a nonmagnetic material. A pair of seals 282 and 284 are provided between the housing 280 and a cylindrical outer side surface of the torsion bar spring 202a. The seals 282 and 284 cooperate with the housing 280 and torsion bar spring 102a to form a chamber 286. The chamber 286 has an annular configuration and encloses the flange 270a.

A magnetic fluid is disposed in the chamber 286 between the housing 280 and the flange 270a. The magnetic fluid may comprise solid magnetizeable reduced carbonyl iron particles suspended in an oil vehicle and a suitable dispersant, such as a silica gel. Such a magnetic fluid is disclosed in U.S. Pat. No. 4,992,190. Alternatively, the chamber 286 could contain a ferro fluid. A ferro fluid is a colloidal suspension of small magnetic particles.

A pair of annular coils 290 and 292 are disposed on the upper and lower sides of the housing 280. The coils 290 and 292 are disposed in a coaxial relationship with the torsion bar spring 102a and torsion tube spring 202a. The coils 290 and 292 extend around the torsion bar spring 102a and are disposed on opposite sides of the flange 270a. The annular coils 290 and 292 are mounted on axially opposite sides of the housing 280 and are spaced from the torsion bar spring 102a.

The coils 290 and 292 are formed of an electrical conductive wire with an insulating covering. The coils 290 and 292 are energized by electrical energy conducted from inner contacts 242a and 244a to conductive strips 246a and 248a disposed on the housing 280. The conductive strips 246a and 248a are electrically insulated from the housing 280. The coils 290 and 292 are electrically connected with the conductive strips 246a and 248a by suitable leads 298 and 300.

An outer housing 302 is fixedly connected with the upper end portion 210a of the torsion tube spring 202a. The outer housing 302 is formed of a nonmagnetic material. The inner housing 280 is fixedly connected with the outer housing 302.

When the clutch 212 is to be operated from the disengaged condition to the engaged condition, the coils 290 and 292 are energized by a control unit, similar to the control unit 220 of FIG. 1. The magnetic field emanating from the coils 290 and 292 is applied to the magnetic fluid disposed in the chamber 286 between the flange 270a and the inner housing 280. The ferro magnetic particles in the magnetic fluid form chains of particles extending across the gap between the inner housing 280 and the flange 270a. When the chains of particles are formed, the chains of particles are magnetically bonded together.

The shear strength of the magnetic fluid in the chamber 286 in a direction normal to the direction of extension of the chains of particles depends upon the strength of the bond and thus the strength of the magnetic field. The shear strength of the magnetic fluid in the chamber 286 changes as the magnetic field acting on the fluid changes. Thus, as the strength of the magnetic field increases, the apparent viscosity of the magnetic fluid increases to increase the force transmitted through the clutch 212a between the torsion tube spring 202a and the torsion bar spring 102a.

Jaw Clutch

In the embodiment of the invention illustrated in FIGS. 5 and 6, the clutch which interconnects the torsion bar spring and the torsion tube spring is a jaw-type clutch. Since the embodiment of the invention illustrated in FIGS. 5 and 6 is generally similar to the embodiments of the invention illustrated in FIGS. 1–4, similar numerals will be utilized to designate similar components, the suffix letter "b" being associated with the numerals of FIGS. 5 and 6 to avoid confusion.

A power steering control valve 22b includes a torsion bar spring 102b which is connected with a torsion tube spring 202b (FIG. 5) by a clutch 212b. The clutch 212b is operable between an engaged condition and a disengaged condition. When the clutch 212b is in the disengaged condition, an upper end portion 210b of the torsion tube spring 202b is disconnected from the torsion bar spring 102b. When the clutch 212b is in the engaged condition, the upper end portion 210b of the torsion tube spring 202b is connected with the torsion bar spring 102b.

When the clutch 212b is engaged, the torsion tube spring 202b is connected in parallel with the torsion bar spring 102b. Both the torsion tube spring and the torsion bar spring are effective to resist relative rotation between inner and outer valve members, corresponding to the inner and outer valve members 40 and 42 of FIG. 1.

The clutch 212b (FIG. 6) is of the jaw-type and includes a plurality of jaws 310, 312, 314, and 316. The jaws 310–316 are disposed in an annular array which is coaxial with the torsion bar spring 102b and torsion tube spring 202b. The annular array of jaws 310–316 extends around the torsion bar spring 102b.

A cam-type actuator ring 320 extends around the circular array of jaws 310–316 and the torsion bar spring 102b. The jaws 310–316 are biased radially outward into engagement with the actuator ring 320 by springs 322. When the clutch 212b is disengaged (FIG. 6), the jaws 310–316 are spaced from the torsion bar spring 102b. When the clutch 212b is to be engaged, the jaws 310 are moved into engagement with the torsion bar spring 102b.

To engage the clutch 212b, the actuator ring 320 is rotated in a counterclockwise direction (as viewed in FIG. 6) by a pair of solenoids 324 and 326 (FIG. 5). To effect rotation of the actuator ring 320, the solenoids 324 and 326 are energized by an electrical current conducted from inner contacts 242b and 244b to contact strips 246b and 248b on a clutch housing 330. The conductive strips 246b and 248b are electrically insulated from the housing 330.

The jaws 310–316 are slidable in radially extending slots or tracks formed in the annular upper and lower walls of the housing 330. The housing 330 is fixedly connected with the torsion tube spring 202b. Therefore, the jaws 310–316 are movable radially relative to the torsion bar spring 102b and torsion tube spring 210b.

When the clutch 212b is in the disengaged condition of FIG. 6, the torsion bar spring 102b can be rotated relative to the torsion tube spring 202b without deflecting the torsion tube spring. When the torsion tube spring 202b is to be connected in parallel with the torsion bar spring 102b to increase the resistance to relative rotation between inner and outer valve members, the clutch 212b is operated from the disengaged condition to the engaged condition.

To effect operation of clutch 212b from the disengaged condition to the engaged condition, a control unit, corresponding to the control unit 220 of FIG. 1, connects the inner contact 242b with a source of electrical energy and the contact 244b with ground. This results in the solenoids 324 and 326 (FIG. 5) being energized. Energization of the solenoids 324 and 326 rotates the actuator ring 320 in a counterclockwise direction (as viewed in FIG. 6).

Counterclockwise rotation of the actuator ring 320 causes cam surfaces 336 on the actuator ring 320 to force the jaws 310–316 radially inward toward the torsion bar spring 102b. As this occurs, teeth 340 on the jaws 310–316 move into engagement with a circular array of teeth 342 on the torsion bar spring 102b to fixedly interconnect the torsion bar spring and the torsion tube spring 202b.

The clutches of FIGS. 3–6 are merely illustrative of many different types of known clutches which could be utilized to interconnect the torsion tube spring 202 and the torsion bar spring 102. For example, a pin-type clutch or a roller-type clutch, having known constructions, could be utilized to interconnect the torsion tube spring 202 and torsion bar spring 102. Although the torsion tube spring 202 and torsion bar spring 102 have been illustrated in FIGS. 1 and 2 in association with a particular type of power steering control valve 22, it is contemplated that the torsion tube spring 202 and torsion bar spring 102 could be associated with any one of many different types of power steering control valves, such as the power steering control valve disclosed in U.S. Pat. No. 3,817,151.

From the above description of the invention, those skilled in the art will perceive improvements, changes and modifications. Such improvements, changes and modifications within the skill of the art are intended to be covered by the appended claims.

What is claimed is:

1. A steering system for a vehicle, said steering system comprising:

first and second valve members which are rotatable relative to each other to port fluid to a vehicle power steering motor;

a first spring connected with said first and second valve members to resist relative rotation between said first and second valve members during operation of said steering system;

a second spring connected with said first valve member;

a clutch connected with said second spring, said clutch being operable from a disengaged to an engaged condition to cause said second spring to resist relative rotation between said first and second valve members along with said first spring; and control means for effecting operation of said clutch between the engaged and disengaged conditions as a function of vehicle operating conditions.

2. A steering system as set forth in claim 1 wherein said first spring transmits force between said first and second valve members along a first force transmission path and said second spring transmits force between said first and second valve members along a second force transmission path when said clutch is in the engaged condition, at least a portion of said second force transmission path is spaced from said first force transmission path.

3. A steering system as set forth in claim 1 wherein said second spring is connected in parallel with said first spring when said clutch is in the engaged condition.

4. A steering system as set forth in claim 1 wherein said first spring is a torsion bar having a first end portion connected with said first valve member and a second end portion connected with said second valve member, said second spring is a torsion tube having a first end portion connected with said first valve member and a second end portion connected with said clutch, at least a portion of said torsion bar is enclosed by said torsion tube.

5. A steering system as set forth in claim 4 wherein said clutch is effective to connect said second end portion of said torsion tube with a portion of said torsion bar disposed between first and second end portions of said torsion bar when said clutch is in the engaged condition.

6. A steering system as set forth in claim 1 wherein one of said first and second valve members is rotatable in a first direction relative to another of said first and second valve members to effect turning movement of steerable vehicle wheels in one direction, said one of said first and second valve members being rotatable in a second direction relative to said another of said first and second valve members to effect turning movement of steerable vehicle wheels in another direction opposite to said one direction, said clutch being ineffective to transmit force during relative rotation between said first and second valve members in the first direction and in the second direction when said clutch is in the disengaged condition, said clutch being effective to transmit force during relative rotation between said first and second valve members in the first direction and in the second direction when said clutch is in the engaged condition.

7. A steering system as set forth in claim 1 wherein said clutch includes a first portion which is connected to said first spring and a second portion which is connected to said second spring, said first and second portions of said clutch being spaced apart when said clutch is in the disengaged condition, said first and second portions of said clutch being disposed in engagement when said clutch is in the engaged condition.

* * * * *